United States Patent
Dadheech et al.

(10) Patent No.: US 10,516,167 B2
(45) Date of Patent: Dec. 24, 2019

(54) FORMED PLATE ASSEMBLY FOR PEM FUEL CELL

(71) Applicant: GM Global Technology Operations LLC, Detroit, MI (US)

(72) Inventors: Gayatri Vyas Dadheech, Bloomfield Hills, MI (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 924 days.

(21) Appl. No.: 14/734,047

(22) Filed: Jun. 9, 2015

(65) Prior Publication Data

US 2015/0270555 A1    Sep. 24, 2015

Related U.S. Application Data

(60) Division of application No. 13/034,870, filed on Feb. 25, 2011, now Pat. No. 9,083,008, which is a
(Continued)

(51) Int. Cl.
*H01M 4/86* (2006.01)
*H01M 8/0258* (2016.01)
(Continued)

(52) U.S. Cl.
CPC ............... *H01M 4/86* (2013.01); *C25D 1/04* (2013.01); *H01M 4/9041* (2013.01); *H01M 4/96* (2013.01);
(Continued)

(58) Field of Classification Search
CPC .................................................. H01M 8/0228
See application file for complete search history.

(56) References Cited

U.S. PATENT DOCUMENTS

| | | | |
|---|---|---|---|
| 4,098,652 A | 7/1978 | Koenig | |
| 6,410,178 B1 * | 6/2002 | Matsukawa | H01M 8/0208 429/514 |

(Continued)

FOREIGN PATENT DOCUMENTS

| | | |
|---|---|---|
| CN | 101111958 A | 1/2008 |
| CN | 101432908 A | 5/2009 |

(Continued)

OTHER PUBLICATIONS

Chandrasekar, M.S., and Malathy Pushpavanam. "Pulse and Pulse Reverse Plating—Conceptual, Advantages and Applications." Electrochimica Acta, vol. 53, No. 8, 2008, pp. 3313-3322. Elsevier BV, doi:10.1016/j.electacta.2007.11.054.*

(Continued)

*Primary Examiner* — Robert S Carrico
(74) *Attorney, Agent, or Firm* — Quinn IP Law (57) ABSTRACT

A bipolar plate assembly for a fuel cell includes a cathode plate disposed adjacent an anode plate. The cathode and anode plates are formed having a first thickness of a low contact resistance, high corrosion resistance material by a deposition process. The first and second unipolar plates are formed on a removable substrate, and a first perimeter of the first unipolar plate is welded to a second perimeter of the second unipolar plate to form a hermetically sealed coolant flow path.

16 Claims, 5 Drawing Sheets

Related U.S. Application Data continuation-in-part of application No. 12/765,042, filed on Apr. 22, 2010, now abandoned.

(51) Int. Cl.

| | | |
|---|---|---|
| *H01M 8/0265* | (2016.01) | |
| *H01M 8/021* | (2016.01) | |
| *H01M 8/0213* | (2016.01) | |
| *H01M 8/0228* | (2016.01) | |
| *H01M 8/0267* | (2016.01) | |
| *H01M 8/0297* | (2016.01) | |
| *H01M 8/0208* | (2016.01) | |
| *H01M 4/90* | (2006.01) | |
| *H01M 4/96* | (2006.01) | |
| *H01M 8/0271* | (2016.01) | |
| *H01M 8/04082* | (2016.01) | |
| *H01M 8/1004* | (2016.01) | |
| *H01M 8/1018* | (2016.01) | |
| *C25D 1/04* | (2006.01) | |
| *C25D 3/56* | (2006.01) | |

(52) U.S. Cl.
CPC ......... *H01M 8/021* (2013.01); *H01M 8/0208* (2013.01); *H01M 8/0213* (2013.01); *H01M 8/0228* (2013.01); *H01M 8/0258* (2013.01); *H01M 8/0265* (2013.01); *H01M 8/0267* (2013.01); *H01M 8/0271* (2013.01); *H01M 8/0297* (2013.01); *H01M 8/04201* (2013.01); *H01M 8/1004* (2013.01); *C25D 3/562* (2013.01); *H01M 2004/8694* (2013.01); *H01M 2008/1095* (2013.01); *H01M 2250/20* (2013.01)

(56) References Cited

U.S. PATENT DOCUMENTS

| | | | |
|---|---|---|---|
| 6,555,261 B1 * | 4/2003 | Lewinski | H01M 4/926 |
| | | | 429/513 |
| 7,425,255 B2 | 9/2008 | Detor et al. | |
| 2003/0068523 A1 * | 4/2003 | Kaneta | B32B 15/018 |
| | | | 428/670 |
| 2003/0190515 A1 | 10/2003 | Brady et al. | |
| 2004/0048135 A1 * | 3/2004 | Hartnack | H01M 8/0208 |
| | | | 429/468 |
| 2005/0244700 A1 * | 11/2005 | Abd Elhamid | H01M 8/0206 |
| | | | 429/480 |
| 2006/0046130 A1 * | 3/2006 | Lai | H01M 8/0228 |
| | | | 429/442 |
| 2006/0141328 A1 | 6/2006 | Johnston et al. | |
| 2006/0204825 A1 * | 9/2006 | Mazza | H01M 8/0206 |
| | | | 429/457 |
| 2008/0292916 A1 * | 11/2008 | Newman | H01M 8/0202 |
| | | | 429/409 |

FOREIGN PATENT DOCUMENTS

| | | |
|---|---|---|
| CN | 101630747 A | 1/2010 |
| DE | 69906860 T2 | 12/2003 |
| DE | 102010020168 A1 | 1/2011 |
| JP | 2009245682 A * | 10/2009 |

OTHER PUBLICATIONS

Machine translation of JP 2009-245682 A (Year: 2009).*

* cited by examiner

FORMED PLATE ASSEMBLY FOR PEM FUEL CELL

CROSS-REFERENCE TO RELATED APPLICATIONS

This application is a divisional of U.S. patent application Ser. No. 13/034,870 filed on Feb. 25, 2011, which was a continuation-in-part of U.S. patent application Ser. No. 12/765,042 filed on Apr. 22, 2010. The entire disclosures of the above applications are incorporated herein by reference.

FIELD OF THE INVENTION

The present disclosure relates to fuel cell stacks and, more particularly, to a bipolar plate assembly and methods for preparing bipolar plates for fuel cell stacks.

BACKGROUND OF THE INVENTION

Fuel cells can be used as a power source in many applications. For example, fuel cells have been proposed for use in automobiles as a replacement for internal combustion engines. In proton exchange membrane (PEM) type fuel cells, a reactant such as hydrogen is supplied as a fuel to an anode of the fuel cell, and a reactant such as oxygen or air is supplied as an oxidant to the cathode of the fuel cell. The PEM fuel cell includes a membrane electrode assembly (MEA) having a proton transmissive, non-electrically conductive, proton exchange membrane. The proton exchange membrane has an anode catalyst on one face and a cathode catalyst on the opposite face. The MEA is often disposed between "anode" and "cathode" diffusion media or diffusion layers that are formed from a resilient, conductive, and gas permeable material such as carbon fabric or paper. The diffusion media serve as the primary current collectors for the anode and cathode as well as providing mechanical support for the MEA and facilitating a delivery of the reactants.

In a fuel cell stack, a plurality of fuel cells is aligned in electrical series, while being separated by gas impermeable, electrically conductive bipolar plates. Each MEA is typically sandwiched between a pair of the electrically conductive plates that serve as secondary current collectors for collecting the current from the primary current collectors. The plates conduct current between adjacent cells internally of the fuel cell stack in the case of bipolar plates and conduct current externally of the stack in the case of unipolar plates at the ends of the stack.

The bipolar plates typically include two thin, facing conductive sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, a flow path for a dielectric cooling fluid is defined.

The typical bipolar plate is a joined assembly constructed from two separate unipolar plates. Each unipolar plate has an exterior surface having flow channels for the gaseous reactants and an interior surface with the coolant channels. The bipolar plates have a complex array of grooves or channels that form flow fields for distributing the reactants over the surfaces of the respective anodes and cathodes. Tunnels are also internally formed in the bipolar plate and distribute appropriate coolant throughout the fuel cell stack, in order to maintain a desired temperature.

The separate unipolar plates are typically produced from a formable metal that provides suitable strength, durability, rigidity, electrical conductivity, and corrosion resistance, such as 316 alloy stainless steel, for example. Austenitic stainless steels have been successfully formed by various processes such as, for example, machining, molding, cutting, carving, stamping, or photo-etching, into bipolar plate materials for PEM fuel cells. The austenitic stainless steel exhibits high corrosion resistance due to a thin passive oxide film on the surface thereof. However, the thin passive oxide film undesirably increases the contact resistance between the bipolar plate surface and the gas diffusion media (GDM) adjacent thereto. To maximize fuel cell performance and current densities, it is desirable to reduce fuel cell resistances. Reducing the contact resistance between the bipolar plate surface and the GDM can significantly reduce total fuel cell resistance, thereby improving performance and current density.

It is known to mitigate high contact resistance by coating stainless steel bipolar plates with expensive noble metals, such as gold, to obtain a low contact resistance between the bipolar plate surface and the GDM. Alternatively, it is known that iron, and to a lesser extent chromium, enrichment in the passive oxide film of a stainless steel alloy increases, rather than decreases, the contact resistance between the bipolar plate surface and the GDM. It is also known that coating the bipolar plates with a high-nickel-content alloy or carbon achieves a significant reduction of the contact resistance between the GDM and the bipolar plate, and would eliminate the need for expensive noble-metal coatings that are currently being used. However, such coatings are not sufficiently durable to withstand stamping or other manufacturing processes.

Additionally, conventional processes of forming the plates from the metal sheet material result in nearly half of the material being discarded as scrap. Some of the scrap is generated as apertures are punched in the non-active portion of the plates to create flow areas and manifolds for delivery and exhaust of reactants and coolant when a plurality of bipolar plates is aligned in the fuel cell stack. A larger portion of the scrap results from a clamping area that is required about the perimeter of the sheet material during the processes that form plates from the sheet material, which is then trimmed or cut off after processing.

There is a continuing need for a cost-effective bipolar plate assembly having an efficient and robust structure that provides an optimized electrical contact between the plates of the assembly while minimizing material usage and waste and maximizing the structural integrity of the plates. A method for rapidly producing the bipolar plate assembly applicable to optimized flowfield designs is also desired.

SUMMARY OF THE INVENTION

In concordance with the instant disclosure, a cost-effective bipolar plate assembly having an efficient and robust structure that provides an optimized electrical contact between the plates of the assembly while minimizing material usage and waste and maximizing the structural integrity of the plate is surprisingly discovered.

The bipolar plate assembly includes a unipolar cathode plate disposed adjacent a unipolar anode plate. At least one of the cathode and anode unipolar plates includes a first thickness of a low contact resistance, high corrosion resistance material formed through a deposition process. The first and second unipolar plates are bonded together by one of soldering, welding, brazing and adhesive bonding to form a bipolar plate. The unipolar plates may further include a substrate onto which the material is deposited. The low contact resistance, high corrosion resistance material may be one of a high nickel content alloy, an alloy with elevated levels of tungsten or molybdenum, a nanocrystalline alloy and carbon.

In one embodiment, the first thickness includes a first layer of low contact resistance, high corrosion resistance material forming a reactant surface and a second layer of low contact resistant, high corrosion resistance material forming a coolant surface.

In another embodiment, a method for preparing a bipolar plate assembly is provided. The method includes providing a substrate having a predetermined external surface pattern; coating the substrate to a predetermined thickness with a low contact resistance, high corrosion resistance material on the surface pattern to form a fuel cell unipolar plate; and joining a pair of unipolar plates together to form a bipolar plate. The substrate may be removed after the metal coating step. The coating may be a high nickel content alloy, a carbon coating, an alloy containing tungsten or molybdenum, a nanocrystalline alloy or other low contact resistance, high corrosion resistance material. The coating may be applied to the substrate with one of a plasma vapor deposition process, a physical vapor deposition process, a chemical vapor deposition process, a thermal spray process, a cold or kinetic spray process, an electroforming plating process such as electroplating or electroless plating, or another method.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
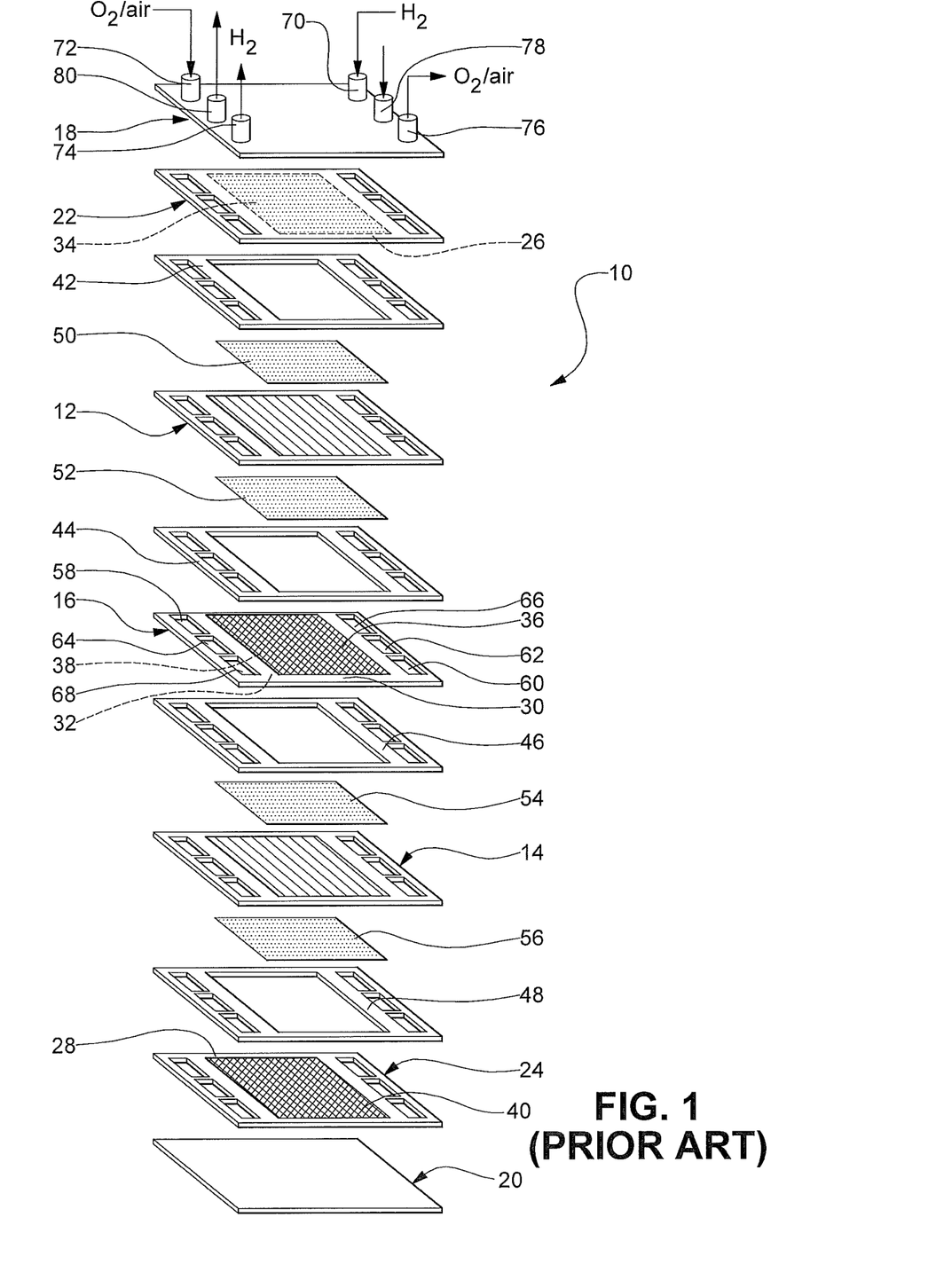
FIG. 1 is a schematic exploded perspective view of a PEM fuel cell stack as is known in the art.

FIG. 1 illustrates a PEM fuel cell stack 10 according to the prior art. For simplicity, only a two-cell stack (i.e. one bipolar plate) is illustrated and described in FIG. 1, it being understood that a typical fuel cell stack will have many more such cells and bipolar plates. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). Respective working faces 26, 28 of each of the unipolar end plates 22, 24, as well as the working faces 30, 32 of the bipolar plate 16, include a plurality of grooves or channels 34, 40, 36, 38 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent the diffusion media 52 on the anode face of the MEA 12 and adjacent the diffusion media 54 on the cathode face of the MEA 14.

As shown, each of the MEAs 12, 14, the bipolar plate 16, the end plates 22, 24, and the gaskets 42, 44, 46, 48 include a cathode supply aperture 58, a cathode exhaust aperture 60, a coolant supply aperture 62, a coolant exhaust aperture 64, an anode supply aperture 66, and an anode exhaust aperture 68. A cathode supply manifold is formed by the alignment of adjacent cathode supply apertures 58 formed in the MEAs 12, 14, the bipolar plate 16, the end plates 22, 24, and the gaskets 42, 44, 46, 48. A cathode exhaust manifold is formed by the alignment of adjacent cathode exhaust apertures 60 formed in the MEAs 12, 14, the bipolar plate 16, the end plates 22, 24, and the gaskets 42, 44, 46, 48. A coolant supply manifold is formed by the alignment of adjacent coolant supply apertures 62 formed in the MEAs 12, 14, the bipolar plate 16, the end plates 22, 24, and the gaskets 42, 44, 46, 48. A coolant exhaust manifold is formed by the alignment of adjacent coolant exhaust apertures 64 formed in the MEAs 12, 14, the bipolar plate 16, the end plates 22, 24, and the gaskets 42, 44, 46, 48. An anode supply manifold is formed by the alignment of adjacent anode supply apertures 66 formed in the MEAs 12, 14, the bipolar plate 16, the end plates 22, 24, and the gaskets 42, 44, 46, 48. An anode exhaust manifold is formed by the alignment of adjacent anode exhaust apertures 68 formed in the MEAs 12, 14, the bipolar plate 16, the end plates 22, 24, and the gaskets 42, 44, 46, 48.

A hydrogen gas is supplied to the fuel cell stack 10 through the anode supply manifold via an anode inlet conduit 70. An oxidant gas is supplied to the fuel cell stack 10 through the cathode supply manifold of the fuel cell stack 10 via a cathode inlet conduit 72. An anode outlet conduit 74 and a cathode outlet conduit 76 are provided for the anode exhaust manifold and the cathode exhaust manifold, respectively. A coolant inlet conduit 78 and a coolant outlet conduit 80 are in fluid communication with the coolant supply manifold and the coolant exhaust manifold to provide a flow of a liquid coolant therethrough. It is understood that the configurations and geometry illustrated in FIG. 1 of the fuel cell stack 10 and the various components thereof, including for example the bipolar plate 16, the various inlets 70, 72, 78, and outlets 74, 76, 80 may vary as desired, and that the specific embodiments shown are representative only.

According to the invention, the bipolar plate 16 is formed having a first thickness of a low contact resistance, high corrosion resistance material through a deposition process. It is understood that the term "low contact resistance" means a measured resistance of less than about 25 milliohms per centimeter squared when measured against a gas diffusion media at a current density of approximately 1 Amp per centimeter squared at 200 psi of compression pressure. It is further understood that the term "high corrosion resistance" means a corrosion current of less than about 1 microAmp when measured under fuel cell simulated conditions, which might include one or more of the following conditions: a pH of 3; an operating temperature of about 80° C.; about 1 part per million Hydrogen Fluoride; about 0.6 Volts applied cathode potential; about −0.4 Volts applied anode potential; a silver-silver chloride reference electrode; and a scan rate of about 1 milliVolt per second.

Figure 2:
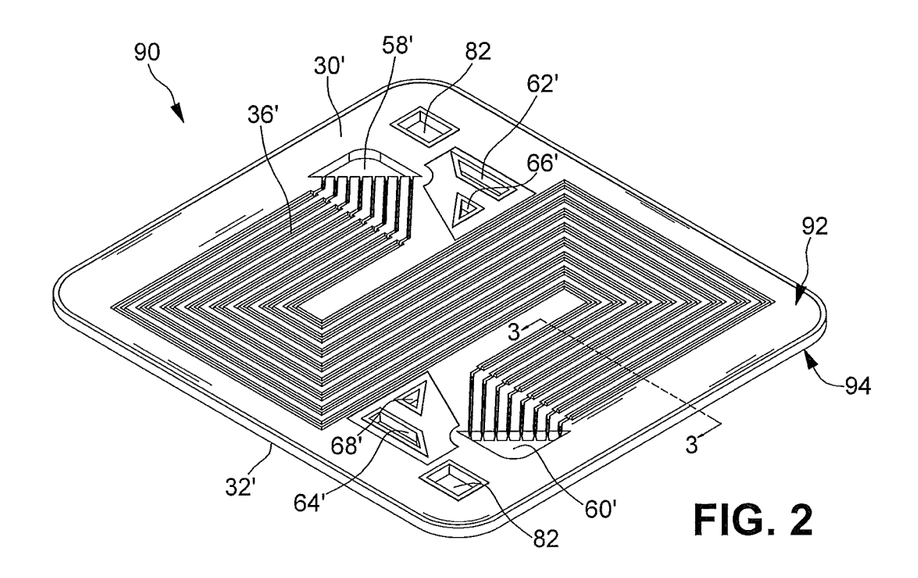
FIG. 2 is a perspective view of a template used to form a bipolar plate assembly according to an embodiment of the present disclosure.

A template 90 for forming a representative bipolar plate 16 is shown in FIG. 2. It is understood that the template 90 is exemplary only, and may be formed into any geometry representative of any bipolar plate, as desired. The template 90 is formed having working faces 30', 32' corresponding to the working faces 30, 32 of the bipolar plate 16, respectively. The working faces 30', 32' include a plurality of grooves or channels 36', 38' adapted to facilitate the flow of a fuel such as hydrogen and an oxidant such as oxygen therethrough. The template 90 further includes apertures 58', 60', 62', 64', 66', 68' corresponding respectively to the cathode supply aperture 58, the cathode exhaust aperture 60, the coolant supply aperture 62, the coolant exhaust aperture 64, the anode supply aperture 66, and the anode exhaust aperture 68. The template 90 may include one or more alignment apertures 82 to allow for assembling a plurality of bipolar plates 16 together to form a fuel cell (not shown). Thus, for example, the working face 30' illustrated in FIG. 2 is representative of a cathode plate working face. The template 90 may include both working faces 30', 32' on opposite faces 92, 94 of the template 90, or it may be formed with only one working face 30' or 32', as desired for a fully implemented roll manufacturing process.

The template 90 may be formed from a stamped or machined steel plate, or the template 90 may be formed of a suitable material that may be easily removed after the deposition process. Suitable materials for the substrate 90 include at least one of a wax, a metal, or a polymer. For example, acceptable results have been obtained where the template 90 is formed from a polystyrene compound.

Figure 3:
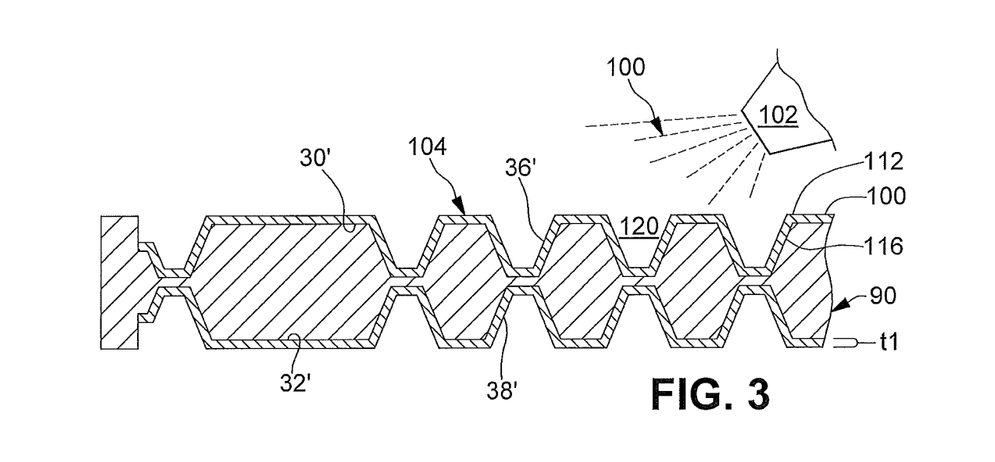
FIG. 3 is a schematic fragmentary cross-sectional elevational view taken along line 3-3 of FIG. 2 of a vapor deposition process applied to a portion of a template used to form the bipolar plate assembly.

Once the template 90 is formed, one or both of the working faces 30', 32' is subjected to a deposition process. A vapor deposition process is illustrated in FIG. 3. Solid coating material (not shown) such as a metal or metal alloy is vaporized by known processes, for example physically in a plasma process or chemically, and is emitted as a vapor 100 from a toolhead 102. The vapor 100 may be applied at any temperature, but favorable results have been obtained with a room-temperature application physical vapor deposition (PVD) process. The toolhead 102 may be formed as a spray nozzle as illustrated in FIG. 3, or it may be formed as a tool in proximity to the working faces 30', 32' to allow for deposition of the vapor 100 onto the working faces 30', 32'. The vapor 100 is a low contact resistance, high corrosion resistance material. The vapor 100 is deposited as a coating 104 onto the working faces 30', 32' to a desired first thickness t1. It is advantageous that the thickness t1 be sufficiently thick to achieve a desired structural performance of the coating 104 when the substrate 90 is removed such as rigidity, conformity and resiliency for example. Favorable results have been obtained where the coating 104 is formed from a high nickel alloy, where the nickel content is at least 50% of the alloy, and more favorably, where the nickel content is at least 80% of the alloy. Favorable results have also been obtained where the coating 104 is a carbon coating. Depending upon the coating material, favorable results have been obtained where the coating thickness t1 is between 5 and 100 microns.

Figure 7:
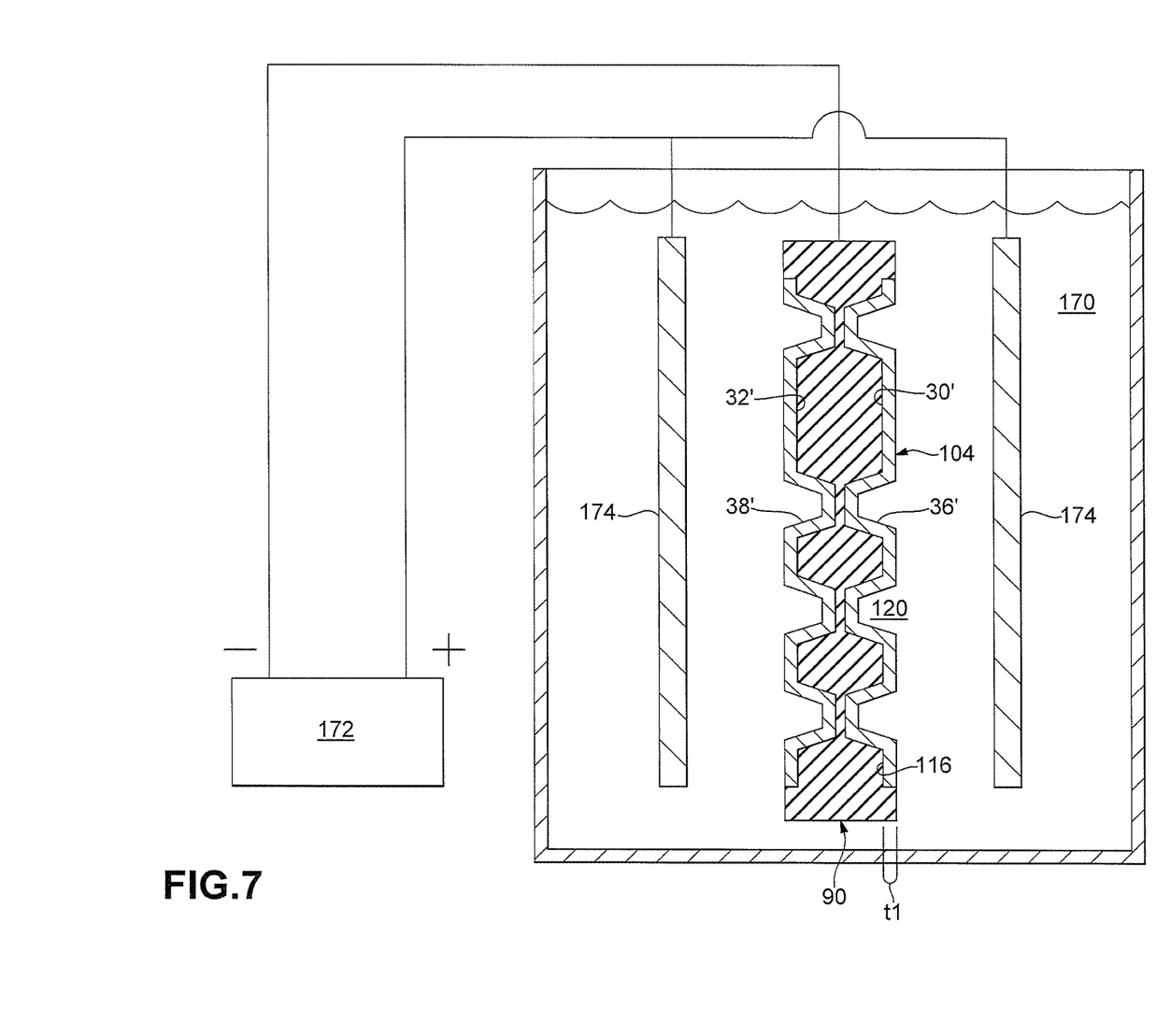
FIG. 7 is a schematic cross-sectional elevational view of an electroforming process applied to a portion of a template used to form a bipolar plate assembly according to another embodiment of the present disclosure.

Favorable results have also been obtained where the coating is applied through an electroforming deposition process, for example, as illustrated in FIG. 7. In the electroforming deposition process, the formed substrate 90 is placed in an electrolyte solution 170. The electrolyte solution 170 has metal ions. Using a power supply 172, a voltage or potential is applied between a pair of anodes 174 and the substrate 90, which behaves as a cathode. The applied voltage causes the metal ions in the electrolyte solution 170 to deposit on the substrate 90 as metal atoms, thereby forming the coating 104. The power supply 172 may be pulsed on and off during the plating process (i.e., pulse plating). The polarity of the anodes 174 and the substrate 90 may also be reversed for short periods during the plating process (i.e., reverse pulse plating) in order to desirably affect the deposition of the coating 104. For example, the reverse pulse plating may permit the deposition of the coating 104 to be substantially crack-free. Skilled artisans also understand that crack-free deposition of the coating 104 can also be obtained from direct current plating or from electroless plating, under suitable conditions. One suitable electrodeposition process is described in U.S. Pat. No. 7,425,255 to Detor et al., the entire disclosure of which is hereby incorporated herein by reference. A skilled artisan may select other suitable electrodeposition processes to deposit the coating 104, as desired.

In particular embodiments, the substrate 90 is formed from a conductive material. When the substrate 90 is formed from the conductive material, the substrate 90 may have nonconductive regions, where it is desired that plating not occur, rendered nonconductive by application of a dielectric coating. In other embodiments, the substrate 90 is formed from a non-conductive material but has conductive regions, where plating is desired to occur, rendered conductive by application of a conductive layer such as a nickel strike or PVD layer, as nonlimiting examples. Other suitably non-conductive and conductive layers may also be employed for the substrate 90, as desired.

It has been advantageously found that a nanocrystalline structure of the coating 104 may be provided by plating of metal alloys. For example, wherein a NiP alloy, NiCr alloy, or a NiW alloy is employed, a nanocrystalline structure (i.e., having grains below about 1 micron in size) can be achieved which can substantially improve the material properties and corrosion resistance of the deposited coating 104. In certain embodiments, the coating 104 having the nanocrystalline structure with a composition of about 80% Ni and about 20% Cr, or about 90% Ni and about 10% W, is provided by the electroforming process. In other embodiments, the coating 104 having the nanocrystalline structure may be provided by electroforming processes with at least one of an FeW alloy, an FeMo alloy, an FeCr alloy, an FeTa alloy, and an FeNb alloy, and mixtures thereof. The coating 104 may also include any mixture of the aforementioned alloys, or mixtures of other suitably corrosion resistant alloys as desired. For example, the coating 104 may be generated having a composition of about 75% Fe and about 25% Cr by electroforming from the electrolyte solution 170. A skilled artisan may select other suitable electrolyte solutions 170, providing other desired metals and metal alloys for forming the coating 104, as desired.

With renewed reference to FIGS. 3 and 7, the coating 104 is deposited so that it conforms with the surface features of the working faces 30', 32', including the plurality of grooves or channels 36', 38'. When a working face 30' has been covered as desired with the coating 104 to the desired thickness t1, the substrate 90 may be removed, leaving only the low contact resistance, high corrosion resistance material as a unipolar plate 110, seen in FIG. 4. After the coating 104 is removed from the substrate 90, the coating 104 may also be electroplated with another conductive layer (not shown) having even lower contact resistance. The unipolar plate 110 has an active face 112 corresponding to the working face 30', and a reverse side corresponding to a coolant flow side 116. The active face 112 is a cathode face or is an anode face, depending upon the geometry of the active face 112, and in particular depending upon the fluid interconnection of the reactant flow channels 120 with either the cathode flow apertures 58, 60 or the anode flow apertures 66, 68.

Figures 4, 5:
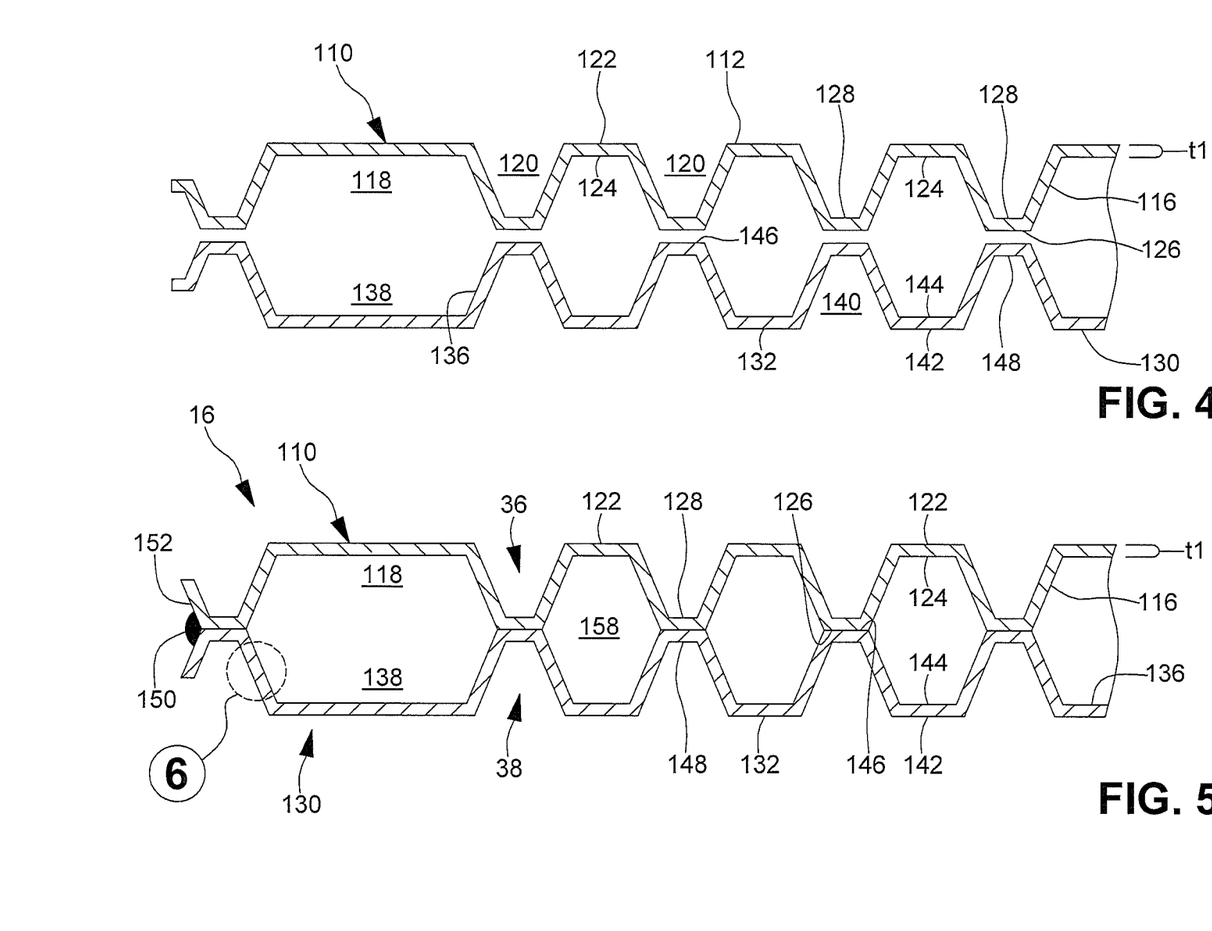
FIG. 4 is a fragmentary cross-sectional elevational view of a pair of unipolar plates formed according to the embodiment of the invention.
FIG. 5 is a fragmentary cross-sectional elevational view of the pair of unipolar plates matingly joined to form the bipolar plate assembly.

Flow channels 118 in the coolant flow side 116 are defined by the reactant flow channels 120 in the active face 112, where lands 122 between reactant flow channels 120 in the active face 112 correspond with the bottoms 124 of the coolant flow channels 118 on the coolant flow side 116, and lands 126 between coolant flow channels 118 on the coolant flow side correspond with the bottoms 128 of the reactant flow channels 120 in the active face 112.

If the substrate 90 includes a second working face 32', the second working face 32' may receive simultaneous or sequential application of the coating 104 to form a second unipolar plate 130 (FIG. 4) on the second working surface 32' prior to removal of the substrate 90. The second unipolar plate 130 includes an active face 132 corresponding to the working face 32', and a reverse side corresponding to a coolant flow side 136. Flow channels 138 in the coolant flow side 136 are defined by the reactant flow channels 140 in the active face 132, where lands 142 between reactant flow channels 140 in the active face 132 correspond with the bottoms 144 of the coolant flow channels 138 on the coolant flow side 136, and lands 146 between coolant flow channels 138 on the coolant flow side correspond with the bottoms 148 of the reactant flow channels 140 in the active face 132.

As shown in FIGS. 4 and 5, once first and second unipolar plates 110, 130 are formed on the substrate 90, the substrate 90 is removed and the first and second unipolar plates 110, 130 are matingly engaged to form the bipolar plate 16. The first unipolar plate 110 is typically attached to the second unipolar plate 130 by solder or a weld 150, either mechanically welding or soldering or via laser welding as appropriate, about the perimeter 152 of the bipolar plate 16 to hermetically seal any coolant flow paths 118, 138. However, other attachment methods can be used as desired, such as brazing or adhesive bonding.

Additionally, the internal perimeter of alignment holes (not shown) may also be bonded to hermetically seal and prevent leakage of coolant therethrough. Seals may be placed around the various apertures in the bipolar plate 16 to militate against migration of the reactants and the coolant, using conventional seal application processes and methods. However, favorable results have been obtained when the perimeter weld 150 is utilized as the coolant seal about the perimeter 152 of the bipolar plate 16.

As best seen in FIG. 5, respective coolant flow sides 116, 136 are matingly engaged to form coolant flow channels 158. In particular, the lands 126 on the coolant flow side 116 of the first unipolar plate 110 matingly engage with the lands 146 on the coolant flow side 136 of the second unipolar plate 130. The respective lands 126, 146 may be metalized to improve the conductivity between the unipolar plates 110, 130. However, because the unipolar plates 110, 130 are formed entirely of a low contact resistance, high corrosion resistance material, the mating engagement of the lands 126, 146 typically provides sufficient conductivity without additional metallization of the interface thereof. Additionally, since the interface of the lands 126, 146 may have sufficient conductivity, welds that are ordinarily made within the active area to improve conductivity between the unipolar plates 110, 130 may be eliminated, thus improving the manufacturability of the bipolar plate 16.

It is not necessary that the coating 104 be a single or uniform material. In one embodiment, shown in FIG. 6, the coating may be applied as more than one layer and as more than one material as desired, to provide an acceptable level of low contact resistance and high corrosion resistance as a function of location on a unipolar plate. The unipolar plate portion shown in FIG. 6 has a first layer 160 forming a coolant surface 162 corresponding to the coolant flow side 136 of the unipolar plate 130. A second layer 164 forms a reactant surface 166 on the active face 132 in contact with reactants. While it is true that both surfaces 162, 166 of the unipolar plate 130 should exhibit low contact resistance and high corrosion resistance, the environment to which the surfaces 162, 166 must be corrosion resistant are very different. As a result, the first layer 160 and the second layer 164 may be formed by different depositions. Additionally, the thicknesses t2, t3 of the respective layers 160, 164 may vary to impart desired rigidity, conformity and resiliency. A support layer 168 may be added between the first layer 160 and the second layer 164 to ensure a desired rigidity, conformity, resiliency, strength, durability, electrical conductivity, or corrosion resistance. As a non-limiting example, if the unipolar plate 132 is a cathode plate, the first layer 160 may be formed from a high nickel content alloy such as 80% Ni-20% Cr having a thickness t2 of 5 to 50 microns. The second layer 164 may be formed of a different high nickel content alloy such as 75% Ni-25% Cr having a thickness t3 of 5 to 50 microns. The intermediate support layer 168 may be formed of a high iron content alloy such as 75% Fe-25% Cr having a thickness t4 of 20 to 100 microns. As a second non-limiting example, if the unipolar plate 132 is an anode plate, the first layer 160 may be formed from a high nickel content alloy such as 80% Ni-20% Cr having a thickness t2 of 5 to 50 microns; the second layer 164 may be formed of a different high nickel content alloy such as 90% Ni-10% Cr having a thickness t3 of 5 to 50 microns; and the intermediate support layer 168 may be formed of a high iron content alloy such as 75% Fe-25% Cr having a thickness t4 of 20 to 100 microns. The ability to specify the composition of each surface of each unipolar plate yields plates having minimum cost and surfaces optimized for the best performance in a fuel cell stack, having the desired balance of low contact resistance and high corrosion resistance depending upon the environment, and to within tight engineering tolerances.

Figure 6:
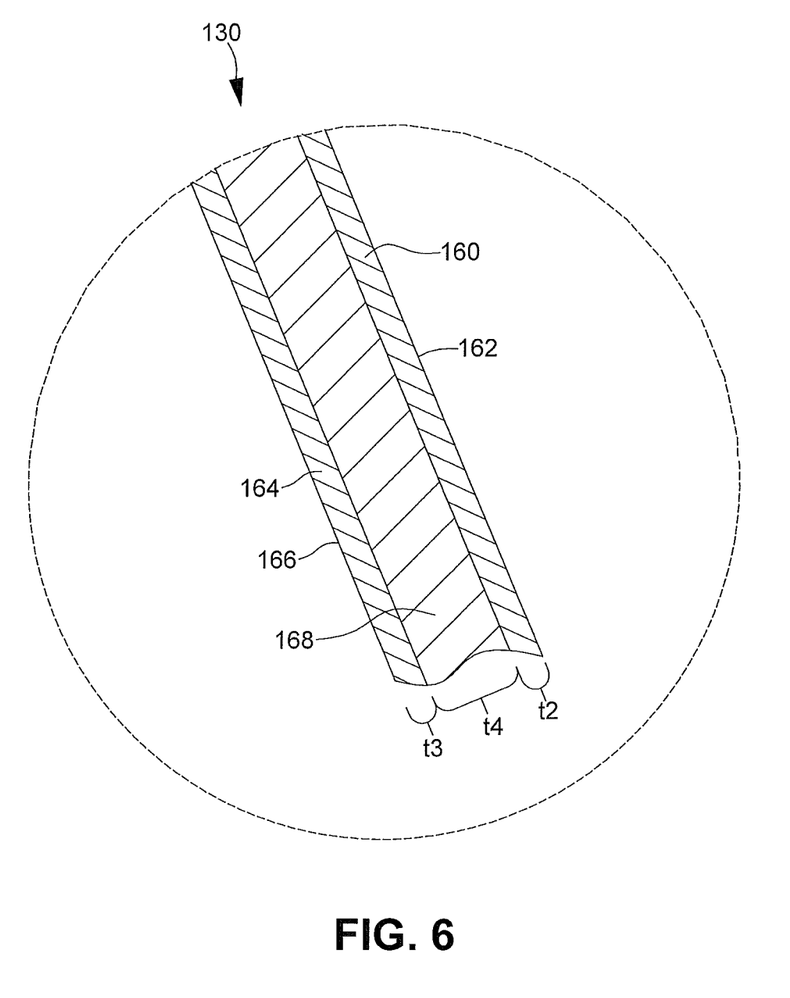
FIG. 6 is a fragmentary cross-sectional elevational detail view taken in circle 6 of FIG. of a portion of FIG. 5.

Additionally, the layers 160, 164 may be selectively and differently applied at various locations of the same unipolar plate to provide a desired characteristic at that location. By way of example, if the low contact resistance, high corrosion resistance material is carbon, locations corresponding to the perimeter 152 of the bipolar plate 16 may include a thin metallic layer and a thin carbon coating. When prepared in this manner, the metal layers of adjacent unipolar plates 110, 130 may be formed to allow soldering or brazing or other low temperature bonding, or to allow application of adhesive for chemical or mechanical bonding. Similarly, the layers 160, 164, 168 may be applied as non-uniform thicknesses on the same plate to ensure adequate strength locally. As a non-limiting example, the layers 160, 164, 168 may be thicker in the areas adjacent the alignment apertures 82 to withstand necessary clamping forces.

Multiple bipolar plates 16 of the present invention may be formed as a continuous manufacturing operation. Advantageously, the deposition process may occur at room temperature and pressure and may be applied to inexpensive substrate material such as polyethylene. Preforming the substrate 90 advantageously allows for design flexibility of the unipolar plates 110, 130 that is not afforded by other manufacturing processes, such as stamping or forming. In particular, the electroforming process allows for deeper grooves 36, 38 and a lower reactant pressure drop across each unipolar plate 110, 130, and avoids metal tearing issues accompanying a metal plate stamping process. Moreover, the metal deposition process requires on the order of 10% to 50% (depending on the thickness t1 desired) less plating material than required in a stamped plate process, and eliminates scrap or waste material in the peripheral regions of the bipolar plate assembly 16. In fact, the vapor deposition process can, when applied to a removable substrate, result in a resilient and thin unipolar plate formed from a material that cannot withstand a stamping manufacturing process.

Trimming or other processing of each unipolar plate 110, 130 after manufacture is minimized because the vapor deposition process may be controlled to accurately deposit the low contact resistance, high corrosion resistance material only as desired. Additional welds within the active area of the bipolar plate 16 may also be eliminated, since mating engagement of portions of the two unipolar plates 110, 130 that comprise the bipolar plate 16 have a sufficiently low contact resistance, especially when compressed together during assembly of a fuel cell. In fact, after-processing of the respective unipolar plates 110, 130 may be limited to perimeter welding thereof to provide adequate sealing of any coolant flow paths and addition of any seals to reactant apertures. The vapor deposition process also eliminates plating operations utilizing expensive noble metals such as gold or hazardous solutions including chromium or nickel ions.

The methods of the disclosure may also be more rapidly performed in comparison to conventional processes for preparing fully-bonded bipolar plate assemblies, and utilize significantly less material than conventional forming processes. Thus, a large amount of waste material is eliminated, while the complex flow field patterns on the unipolar plates may be repetitively manufactured. Finally, extremely thin unipolar plate assemblies may be manufactured, at reduced costs over conventional plates, which minimize the overall size and cost of a fuel cell assembly.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate assembly for a fuel cell, comprising:
a unipolar cathode plate; and
a unipolar anode plate joined with the cathode plate, at least one of the cathode plate and the anode plate having a first predetermined thickness of a first material, the first material being a low contact resistance, high corrosion resistance material formed by a deposition process on a formed substrate, the first material being generally applied to the formed substrate in a first predetermined thickness at locations defining a desired flow field pattern, the first material being locally applied to the substrate in a third predetermined thickness proximate to an alignment aperture of the at least one of the cathode plate and the anode plate such that the third predetermined thickness is greater than the first predetermined thickness; and a second material different from the first material applied to the first material at locations defining a perimeter of the at least one of the cathode plate and the anode plate, the second material being a second low contact resistance, high corrosion resistance material.

2. The bipolar plate assembly of claim 1, wherein the low contact resistance, high corrosion resistance material is a high nickel content alloy including at least 50 percent by atom on a basis of all atoms in the low contact resistance, high corrosion resistance material.

3. The bipolar plate assembly of claim 1, wherein the low contact resistance, high corrosion resistance material is a nanocrystalline alloy.

4. The bipolar plate assembly of claim 3, wherein the nanocrystalline alloy is one of an FeW alloy, an FeMo alloy, an FeCr alloy, an FeTa alloy, an FeNb alloy, and mixtures thereof.

5. The bipolar plate assembly of claim 1, wherein the low contact resistance, high corrosion resistance material is carbon.

6. The bipolar plate assembly of claim 1, wherein at least a portion of an active area of the anode plate matingly engages at least a portion of an active area of the cathode plate to provide electrical conductivity therebetween.

7. The bipolar plate assembly of claim 1, wherein the first predetermined thickness is between 5 and 100 microns.

8. The bipolar plate assembly of claim 1, wherein a first perimeter of the cathode plate is integrally joined with a second perimeter of the anode plate to form a substantially hermetic seal therebetween.

9. The bipolar plate assembly of claim 1, wherein variation of the first predetermined thickness is less than 50 nanometers.

10. A fuel cell stack comprising:
a plurality of membrane electrode assemblies arranged in a stacked configuration;
a bipolar plate assembly disposed between adjacent membrane electrode assemblies, the bipolar plate assembly including a unipolar cathode plate joined to a unipolar anode plate;
a first material forming the cathode plate and the anode plate, the first material being a first low contact resistance, high corrosion resistance material, the first material being generally applied to a substrate in a first predetermined thickness at locations defining a desired flow field pattern, the first material being locally applied to the substrate in a third predetermined thickness proximate to an alignment aperture of each of the cathode plate and the anode plate such that the third predetermined thickness is greater than the first predetermined thickness; and a second material different from the first material applied to the first material at locations defining a first perimeter of the cathode plate and a second perimeter of the anode plate, the second material being a second low contact resistance, high corrosion resistance material, wherein variation of the first predetermined thickness is less than 50 nanometers, and wherein the cathode plate and the anode plate are removed from the substrate prior to assembly of the fuel cell stack.

11. The fuel cell stack of claim 10, wherein at least a portion of an active area of the anode plate matingly engages at least a portion of an active area of the cathode plate to provide electrical conductivity therebetween.

12. The fuel cell stack of claim 10, wherein the first predetermined thickness is between 5 and 100 microns.

13. The fuel cell stack of claim 10, wherein the first predetermined thickness of the first material of the cathode plate abuts diffusion media of a first membrane electrode assembly, and the first predetermined thickness of the first material of the anode plate abuts diffusion media of a second membrane electrode assembly.

14. The fuel cell stack of claim 13, wherein the substantially hermetic seal is formed by one of welding, laser welding, brazing and soldering.

15. The fuel cell stack of claim 10, wherein the second material is generally applied in a second predetermined thickness to the locations defining the first perimeter and the second perimeter, and the second material is locally applied in a fourth predetermined thickness to locations proximate to the alignment aperture of each of the anode plate and the cathode plate such that a thickness of the second material proximate to the alignment aperture is greater than the second predetermined thickness.

16. An assembly comprising:

a substrate having a first substrate external surface corresponding to a desired cathode plate flow field pattern and a second substrate external surface corresponding to a desired anode plate flow field pattern;

a first material applied to the first substrate external surface and the second substrate external surface forming a cathode plate on the first substrate external surface and an anode plate on the second substrate external surface, the first material being a first low contact resistance, high corrosion resistance material, the first material being applied such that a first predetermined thickness is generally applied to the first substrate external surface and the second substrate external surface at locations defining a desired flow field pattern and such that a third predetermined thickness is locally applied proximate to an alignment aperture of each of the anode plate and the cathode plate such that the third predetermined thickness is greater than the first predetermined thickness; and a second material different from the first material applied to the first material at locations to define a first perimeter of the cathode plate and a second perimeter of the anode plate, the second material being a second low contact resistance, high corrosion resistance material, the second material being applied such that a second predetermined thickness is generally applied to the locations defining the first perimeter and the second perimeter and such that a fourth predetermined thickness is locally applied proximate to the alignment aperture of each of the anode plate and the cathode plate such that a thickness of the second material proximate to the alignment aperture is greater than the second predetermined thickness, wherein variation of each of the first predetermined thickness and the second predetermined thickness is less than 50 nanometers.

* * * * *